United States Patent [19]
Belknap et al.

[11] Patent Number: 4,710,871
[45] Date of Patent: Dec. 1, 1987

[54] DATA TRANSMITTING AND RECEIVING APPARATUS

[75] Inventors: William M. Belknap; Albert J. Chanasyk; Robert R. O'Dell; Donald J. Girard, all of Cambridge, Ohio

[73] Assignee: NCR Corporation, Dayton, Ohio

[21] Appl. No.: 438,105

[22] Filed: Nov. 1, 1982

[51] Int. Cl.⁴ .............................................. G06F 13/00
[52] U.S. Cl. ................................... 364/200; 371/67; 371/69; 370/86; 340/825.05
[58] Field of Search ... 364/200 MS File, 900 MS File; 370/94, 92, 91, 86, 85; 371/67, 69

[56] References Cited

U.S. PATENT DOCUMENTS

| | | | |
|---|---|---|---|
| 3,973,242 | 8/1976 | Field et al. | 340/168 B |
| 4,093,823 | 6/1978 | Chu | 370/92 |
| 4,136,798 | 5/1979 | Doelz | 364/200 |
| 4,168,469 | 9/1979 | Parikh et al. | 370/85 |
| 4,254,499 | 3/1981 | Voshikane | 370/85 |
| 4,304,001 | 12/1981 | Cope | 371/8 |
| 4,319,323 | 3/1982 | Ermalovich et al. | 364/200 |
| 4,335,426 | 6/1982 | Maxwell et al. | 364/200 |
| 4,339,795 | 7/1982 | Brereton et al. | 364/200 |
| 4,344,132 | 8/1982 | Dixon et al. | 364/200 |
| 4,346,440 | 8/1982 | Kyu et al. | 364/200 |
| 4,396,983 | 8/1983 | Segarra et al. | 364/200 |
| 4,402,046 | 8/1983 | Cox et al. | 364/200 |
| 4,417,320 | 11/1983 | Ei | 364/900 |
| 4,466,058 | 8/1984 | Girard et al. | 364/200 |
| 4,471,485 | 9/1984 | Prevot et al. | 371/35 |

OTHER PUBLICATIONS

*Electronics;* Sep. 11, 1980; "Intelligent Buffer Reconciles Fast Processors and Slow Peripherals"; Daniel L. Hillman; pp. 131–135.

*Primary Examiner*—Eddie P. Chan
*Assistant Examiner*—Christina Eakman
*Attorney, Agent, or Firm*—Wilbert Hawk, Jr.; Richard W. Lavin

[57] ABSTRACT

A system for controlling the transfer of a data message over a common communication channel between a plurality of processing devices includes a MOS/LSI controller chip associated with each processing unit for constructing a message to be sent to a sending device acknowledging the receipt of the message and the validity of the message. Logic circuits are included which generate a predetermined sequence of two binary bits indicating the receipt of the message and the validity of the receiving message. The binary bits are framed by two other binary bits and the sequence repeated a predetermined number of times to construct an acknowledgment message. The controller chip further includes logic circuits for decoding the acknowledgment message.

8 Claims, 11 Drawing Figures

DATA TRANSMITTING AND RECEIVING APPARATUS

CROSS-REFERENCE TO RELATED APPLICATION

Reference is hereby made to U.S. Pat. No. 4,466,058 which issued on Aug. 14, 1984 in the name of Girard et al. and assigned to the assignee of the present application.

BACKGROUND OF THE INVENTION

The present invention is directed to a system for transmitting data between a plurality of data processing units and more particularly to a communication controller which includes a circuit for generating signals acknowledging the receipt of a data message from a sending data processing unit.

In data processing units in which a central processing unit or multiple processing units are connected over a common communication channel to a plurality of peripheral devices, data may be transmitted over the communication channel between one of the central processor units and one of the peripheral devices, or between a sending and receiving peripheral device, or between processing units. As part of the communication protocol, the receiving device is required to transmit data to the sending device acknowledging receipt of the data. The simplest acknowledged message comprises a sequence of binary 0's or binary 1's. The transmitting or sending device then detects the presence of the transitions on the communications channel and assumes that the message has been received. However, it has been found that noise present on the communication channel could look like an acknowledgment to the sending device even though the message might be in error. Another type of acknowledgment message that is commonly used comprises a standard data message which normally includes opening and closing flags, an acknowledgment status character and a check character to ensure that the status character is properly received. It is obvious that the use of this type of message construction requires an increase in the length of the response time of the data transmissions between the sending and receiving devices. It is therefore a principal object of this invention to provide a data transmission system in which the acknowledgment message of a receiving device is in a form which provides a maximum amount of information with a minimal amount of transmitted data bits, and provides a high degree of detection by the sending data processing device.

SUMMARY OF THE INVENTION

These and other objects of the invention are fulfilled by providing a LSI semiconductor controller chip which is associated with each processing unit of a system comprising a plurality of processing units for controlling the transmission and receiving of a data message between peripheral devices associated with each of the processing units or between other processing units. Included in the controller chip are logic circuits for generating signals representing the status of the received data message enabling a shift register to output one of a plurality of two bit binary words representing the status of the received data message. Each binary word may indicate the receipt of either a valid or invalid data message or that the receiving processor is unable to receive the data message. The shift register further outputs a pair of binary bits framing the outputted binary word. Timing control circuits enable the shift register to output the four bit binary word a predetermined number of times for transmission to the sending processing device as an acknowledgment message. The controller chip further includes logic circuits for processing the received acknowledgment message from a receiving device.

DESCRIPTION OF THE PREFERRED EMBODIMENT

Figure 1:
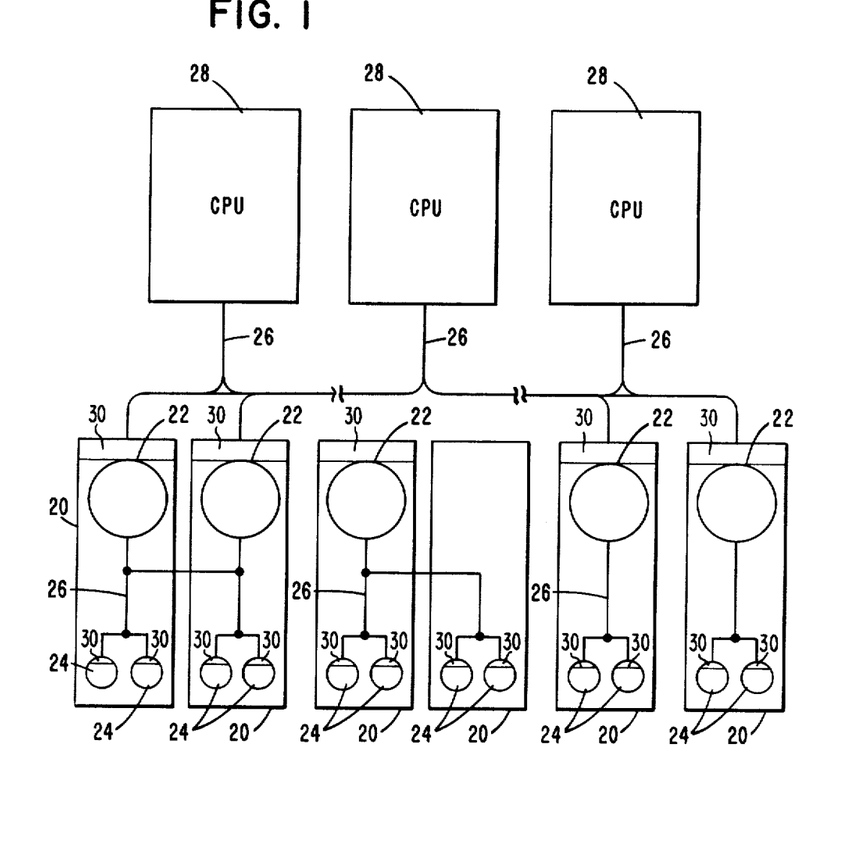
FIG. 1 is a block diagram of a data processing system showing the processing units which comprise the system.
Figure 7:
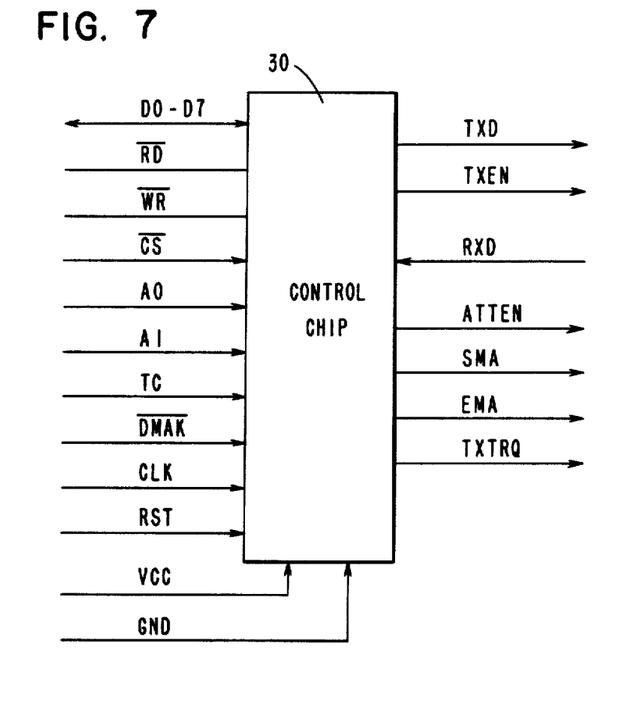
FIG. 7 is a schematic diagram of the pin configuration of the controller chip.

Referring now to FIG. 1, there is shown a data processing system which includes a plurality of processing units which may take the form of data terminal devices 20 each of which includes a microprocessor unit 22 interconnected with a plurality of peripheral or I/O devices 24 which may comprise keyboards, display controllers, printer controllers, digital cassette controllers or other I/O devices associated with the functional operation of data terminal devices. The I/O devices 24, together with the data terminal devices 20, are interconnected by a communications channel 26 which may comprise twisted pairs of wires over which data in serial form is transmitted between the terminal devices themselves and a plurality of central processor units 28. Controlling the transfer of data on a communications channel 26 is a MOS-LSI communication controller chip 30 (FIG. 7) associated with each of the I/O devices 24 and the microprocessor unit 22. In accordance with the present invention, the chip 30 will initiate the transmission of a data message in response to instructions received over an internal bus 23 (FIG. 4a) from a mrcroprocessor unit (not shown) associated with the chip and located in the transmitting peripheral or I/O device and will process the acknowledgment message transmitted from the receiving device.

Figure 2:
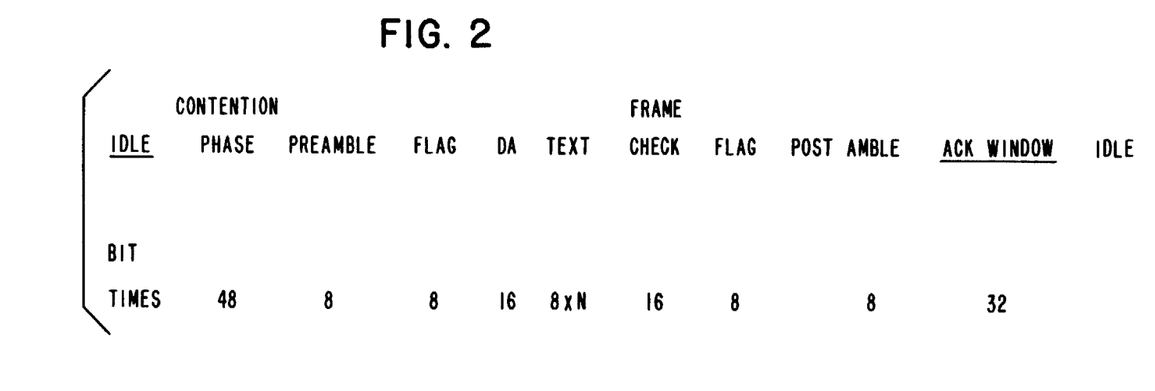
FIG. 2 is a diagram of the frame message used in the communication system indicating the bit times for each portion of the frame message.

As fully disclosed in the cited co-pending application, the chip 30 cannot begin sending a message unless the channel 26 is in an idle state. The channel 26 is considered in an idle state when the chip detects at least eight successive quiet time slots on the channel. A quiet time slot is defined as being a time period six bits long in which three or less voltage transitions have been detected. Once an idle state is detected, the controller chip will initiate the transmission of a data message which, as shown in FIG. 2, starts with a contention phase in which the controller chip attempts to gain control of the communications channel. Once gaining access to the communications channel 26, the controller chip will output the data message which may be constructed in accordance with the format shown in FIG. 2, which includes an ACK window portion thirty-two bit times in length during which time the controller chip 30 will be in condition to receive an acknowledgment message from the receiving device. This acknowledgment message may take one of the forms shown in FIGS. 3A–3C inclusive, a description of which will be disclosed more fully hereinafter.

Figure 4A:
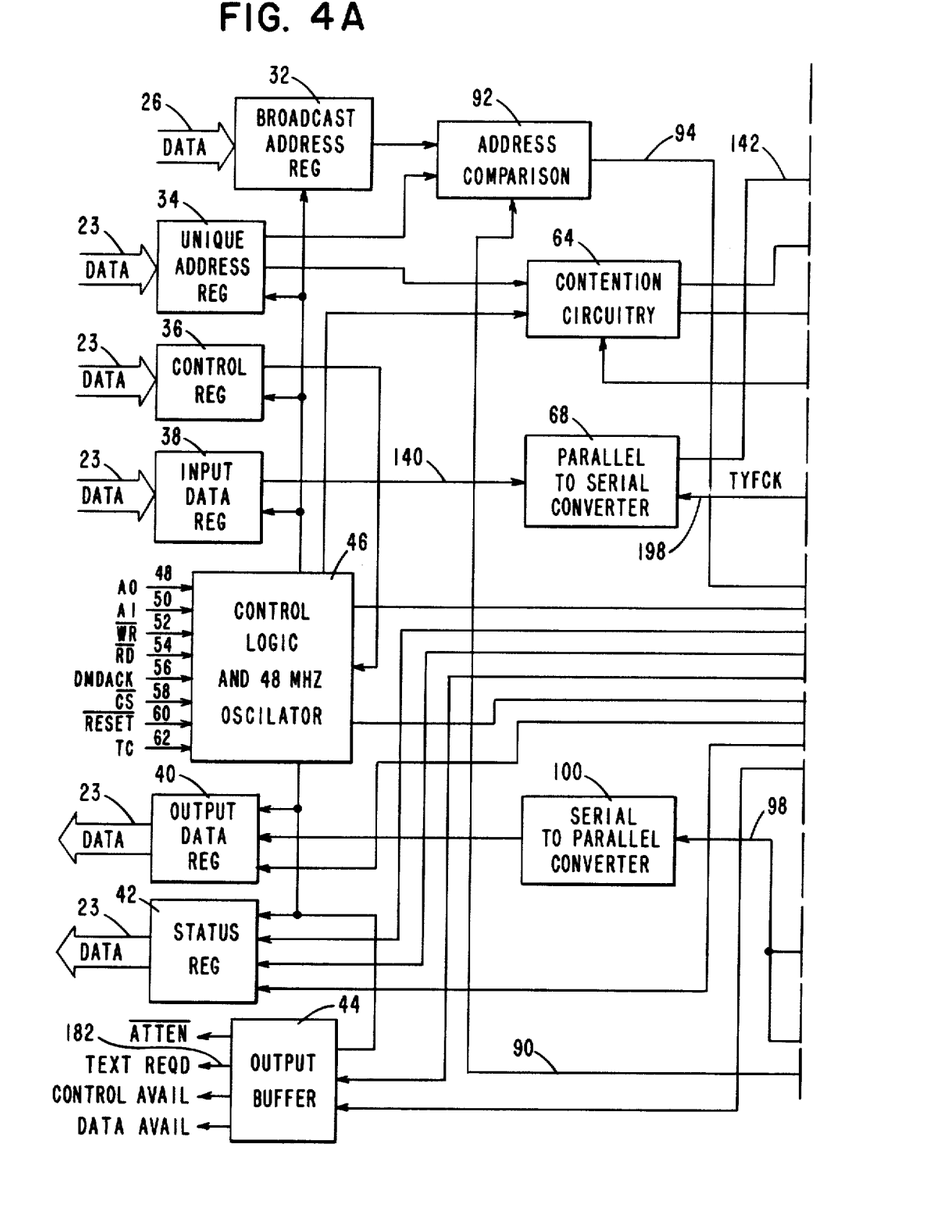
FIGS. 4A and 4B taken together disclose a block diagram of the controller chip.
Figure 4B:
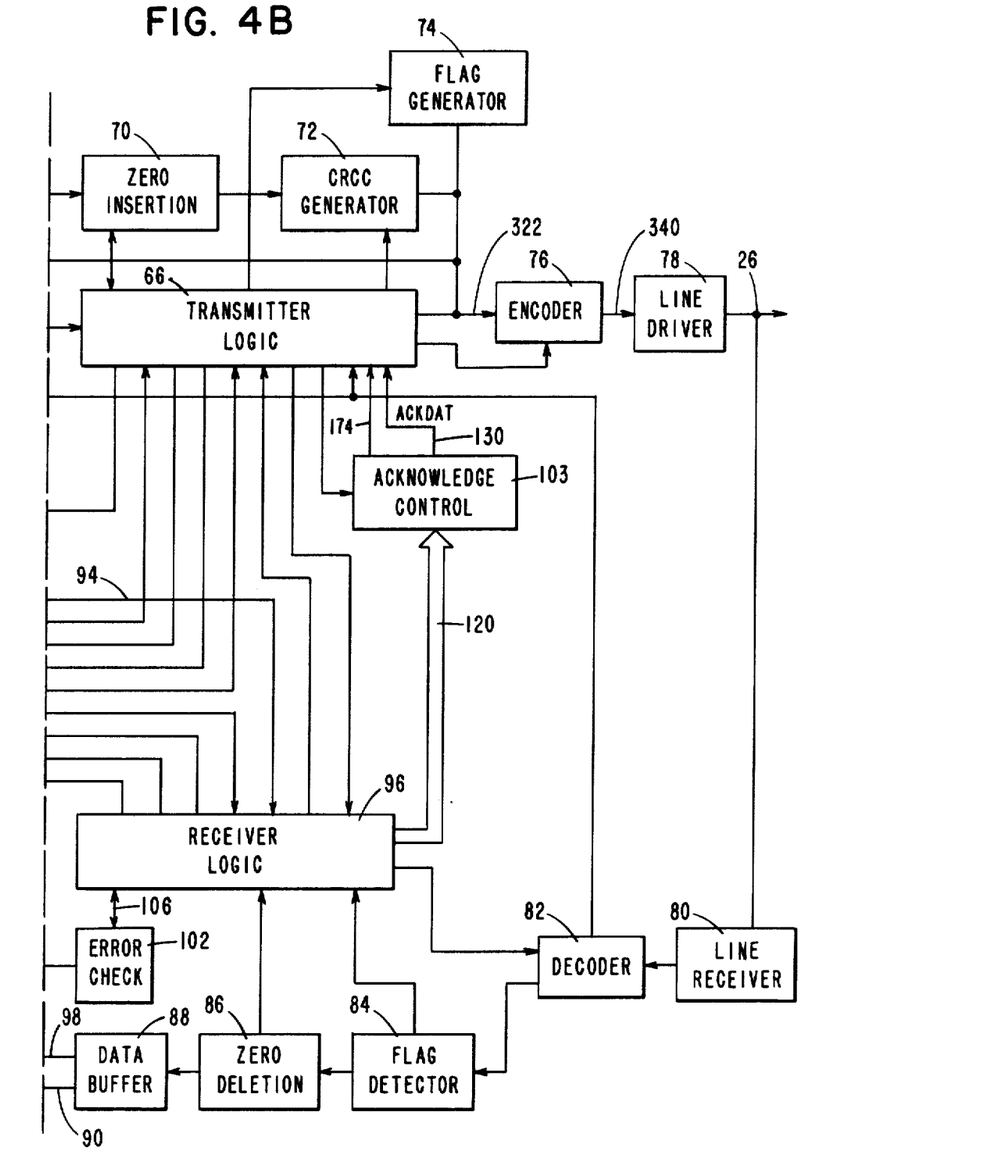

Referring now to FIGS. 4A and 4B, there is disclosed a block diagram of the controller chip 30 (FIG. 7) associated with each of the processing units 20 and the peripheral devices 24 (FIG. 1). Included in the chip is a broadcast address register 32 for storing the broadcast address of the I/O device 24 associated with the chip 30. The controller chip 30 of each I/O device is assigned a unique address identifying that controller chip and its associated device and a broadcast address which identifies the terminal within which the device is located. This latter address is stored in the register 32 while the unique address is stored in the register 34 at the time power is applied to the chip. Further included in the chip is a controller register 36 which stores data for controlling the operation of the chip; an input data register 38 which stores the data received from the microprocessor 22 and which is to be transmitted over the communications channel 26; an output data register 40 for storing the data received from the communications channel 26 for the I/O device; a status register 42 for storing data representing the status of the microprocessor 22 communicating with the chip 30 or the status of the message transmitted to the receiving device; and an output buffer 44 for storing interrupt signals for use in communicating with the microprocessor 22 in a manner that is well-known in the art.

Connected to the registers 32–42 inclusive is a control logic unit 46 which includes a 4.8 MHz. oscillator for generating clock signals used in the operation of the chip 30. The control logic unit 46 receives control signals from the microprocessor unit (not shown) associated with the chip over an 8 bit internal data bus 23. Included in these signals are the signals AO and A1 transmitted over lines 48 and 50 which are part of the data bus 23 (FIG. 4A), the active low write signal $\overline{WR}$ received over line 52 and the active low read signal $\overline{RD}$ transmitted over line 54. These signals control the selection of the registers 32–44 inclusive in addition to notifying the chip 30 of a write or read operation processed by the microprocessor 22.

The control logic unit 46 also receives over line 56 an acknowledgment signal DMDACK when a DMA chip is used in controlling message transfers between the chips 30 and the main storage memory. A chip select signal $\overline{CS}$ is transmitted over line 58 while a reset signal $\overline{RESET}$ is transmitted over line 60. If a DMA chip is employed, a signal TC appearing on line 62 notifies the chip 30 that the present DMA cycle is the last cycle for the data being transferred to the input data register 38.

When the microprocessor 22 of the terminal 20 (FIG. 1) or the microprocessor associated with each peripheral device 24 is requesting a write operation, the unique address of the controller chip associated with the microprocessor 22 or the device 24 stored in the address register 34 (FIG. 4A) is used by the contention circuitry 64 for determining if the communication channel 26 is available for transmission. If it is, the transmitter logic unit 66 (FIG. 4B) will enable a parallel-to-serial converter 68 (FIG. 4A) to output over line 142 the data stored in input data register 38 to a zero insertion unit 70 (FIG. 4B) which inserts zero bits in the data as required to keep the data bit pattern from matching the flag pattern. A frame check generator 72 inserts the sixteen (16) bit frame check sequence bits into the frame message (FIG. 2) for use in detecting the presence of transmission errors within the message. A flag generator 74 generates flag characters at the beginning and at the end of the message frame (FIG. 2). A biphase encoder unit 76 encodes the outgoing binary message into biphase coded transmission data in which a binary bit one is represented by a series of transitions having a frequency of 300 KHz while the binary bit zero is indicated by transitions having a frequency rate of 150 KHz. This data is outputted over the communication channel 26 by the line drivers 78.

When the controller chip 30 is receiving data over the communication channel 26, the data is transmitted through a line receiver unit 80 and is decoded by the decoder unit 82 which recovers bit-cell clock information from the incoming biphase signals and reproduces the original binary data. A flag detector unit 84 detects the flag patterns on a bit-by-bit basis a zero deletion unit 86 deletes any zero bits which were inserted into the frame check bit stream during transmission. The recovered data is assembled in a data buffer 88 on a byte-by-byte basis from which the addressed portion of the data message is transmitted over line 90 to an address comparison unit 92 (FIG. 4A) which compares the addressed portion of the received message with the unique and broadcast addresses stored in the registers 32 and 34 to identify the controller chip 30 for which the message is intended. The result of the comparison operation is transmitted over line 94 to a receiver logic unit 96 which controls the processing of the received message including the generation of the acknowledgment message.

The received message stored in the data buffer 88 is transmitted over line 98 to a serial-to-parallel converter 100 (FIG. 4A) after which the error check unit 102 (FIG. 4B) checks the frame check portion of the message (FIG. 2) to detect the presence of any transmission errors within the frame. The converter 100 will output the received data in an 8-bit parallel form for storage in the output data register 40 prior to transmission of the data to the host processor over the data bus 23.

Figure 5A:
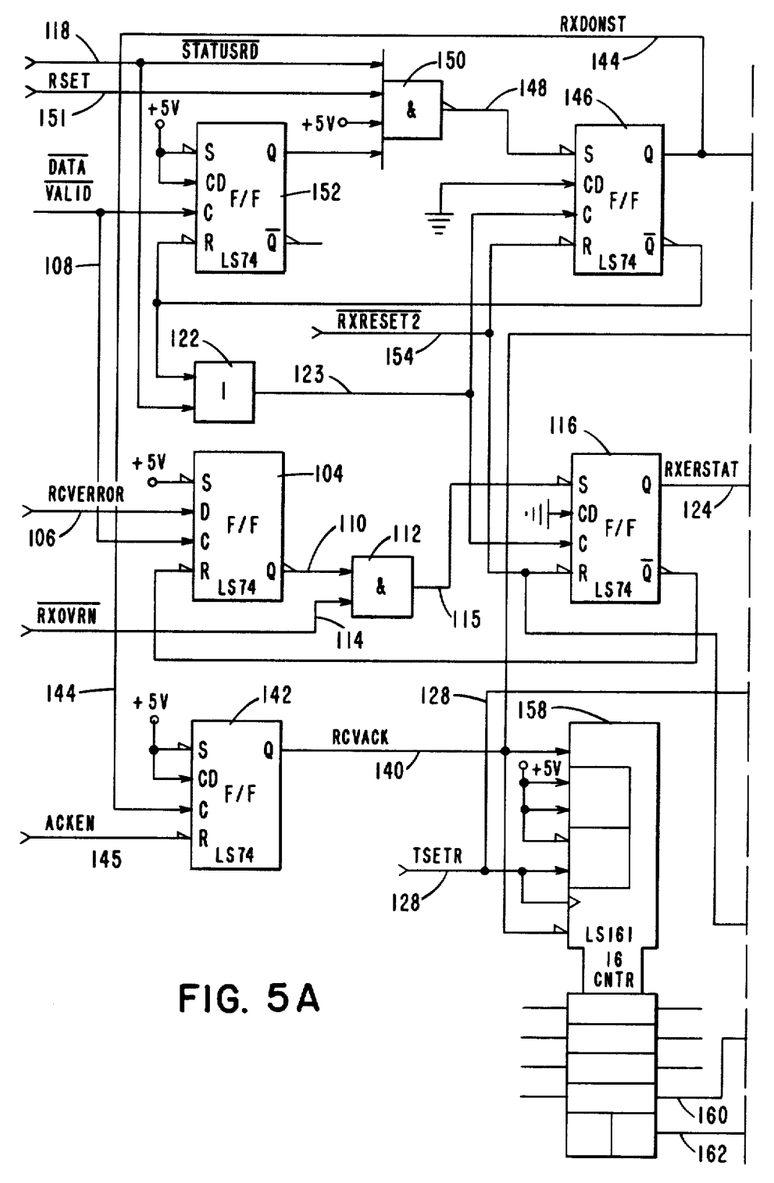
FIGS. 5A and 5B taken together disclose the logic circuits in the acknowledge control unit of FIG. 4B used in the generation of the acknowledgment portion of the frame message.
Figure 5B:
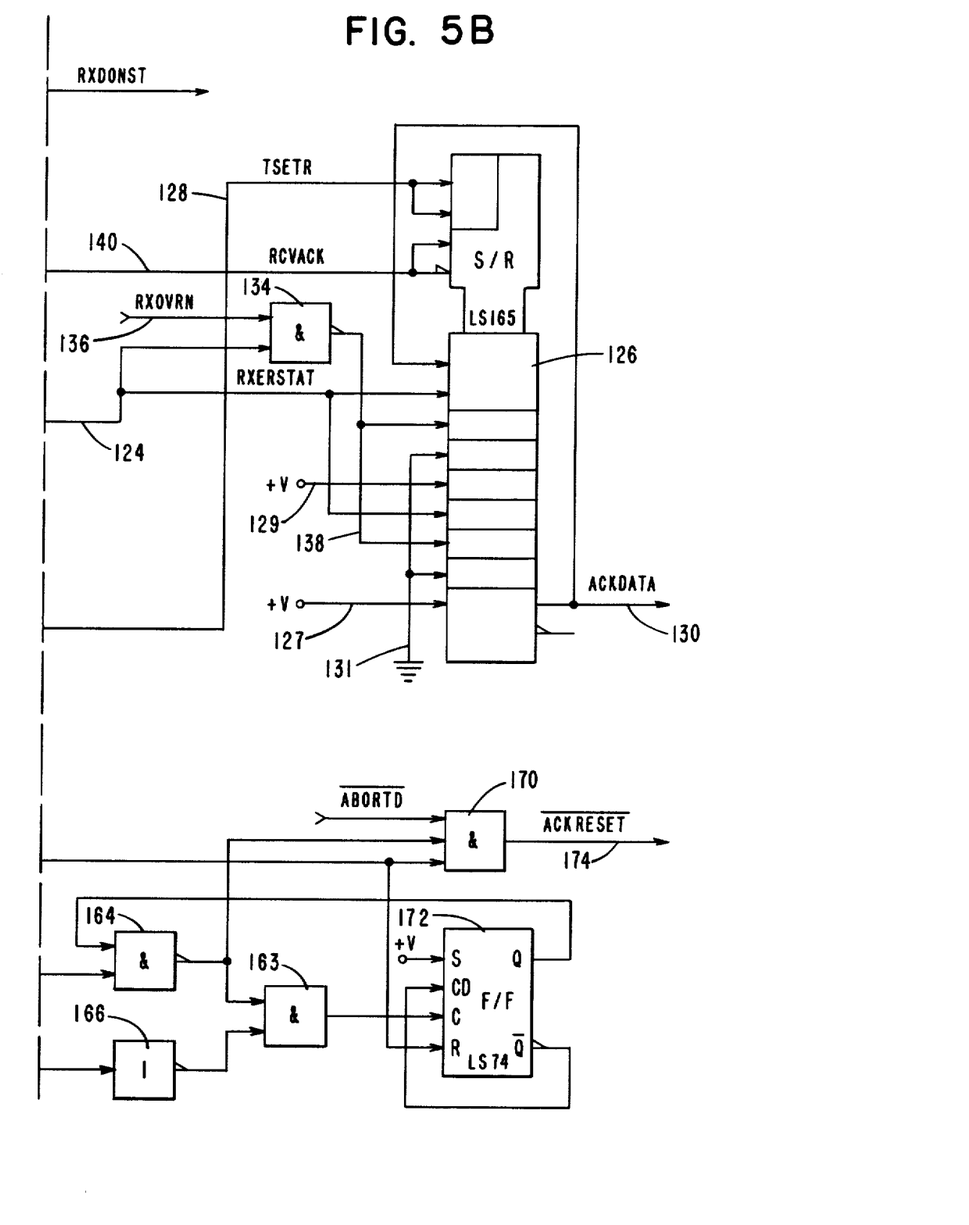

Referring now to FIGS. 5A and 5B taken together, there is disclosed logic circuitry associated with the generation of the acknowledgment message transmitted to the sending device by the receiving device during the ACK WINDOW portion (FIG. 2) of the transmitted data message. As shown in FIG. 5A, the D input of a LS74 flip-flop 104 located in the receiver logic unit 96 (FIG. 4B) will receive over line 106 the high receiver error signal RECERROR from the error check unit 102 (FIG. 4B) when the unit determines that a CRC error is present in the received data message. Upon the appearance of a high system clock signal $\overline{DATAVALID}$ on line 108 which goes low during the time data is being received by the chip 30 and goes high after the data has been received, the flip-flop 104 will output a low signal over the Q output line 110 to one input of an AND gate 112 located in the acknowledge control unit 103 (FIG.

4B) which also receives over line 114 of the bus 120 (FIG. 4B) the normal receiver overrun error signal $\overline{\text{RXOVRN}}$ from the receiver logic unit 96 (FIG. 4B). The signal $\overline{\text{RXOVRN}}$ becomes low when the receiver logic unit 96 is unable to process the incoming data.

In response to receiving the low signal over line 110, the AND gate 112 will output over line 115 a low signal to the inverted set input of a LS74 flip-flop 116 which outputs the high receive error status signal RXERSTAT over line 124 to the control inputs of a LS165 parallel-in-serial-out 8-bit shift register 126 (FIG. 5B). The flip-flop 116 will be reset by the receiver reset signal $\overline{\text{RXRESET2}}$ transmitted over line 154 of the bus 120 (FIG. 4B) from the receiver logic unit 96 at the completion of the chip receiving the transmitted data message. The shift register 126, when clocked by the clock signal TSETR appearing on line 128 of the bus 120 (FIG. 4B), will output a 4-bit pattern of 1011 (FIG. 3B) over the output line 130 in accordance with the signals appearing on the output of a NAND gate 134 (FIG. 5B) and the flip-flop 116 as will be described more fully hereafter. This bit pattern is repeated to comprise the 32-bit acknowledge message ACKDATA which is transmitted over line 130 to the transmitter logic unit 66 (FIG. 4B), from where it is sent to the encoder unit 76 for transmission over the communication line 26 by the line driver 78.

The signal RXERSTAT appearing on line 124 is also transmitted to one input of a NAND gate 134 which also receives over line 136 of the bus 120 (FIG. 4B) the receiver overrun error signal RXOVRN from the receiver logic unit 96. The NAND gate 134 determines the type of error that is detected by the transmitter logic unit 96. If the error consists of an overrun condition, the signal RXOVRN appearing on line 136 will be high. With the signal RXERSTAT being high at this time, the output signal appearing on line 138 of the NAND gate 134 will be low, which signal will appear as zero bits 3 and 7 in the output data signals of the counter 126.

Figure 3A:
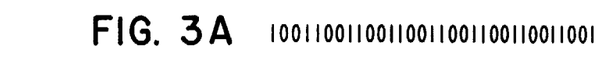
FIGS. 3A-3C inclusive illustrate the sequence of binary bits which comprise the acknowledgment portion of the frame message for a receiver overrun, an error message and good message, respectively.

As shown in FIG. 5B, the first and fifth binary bit of each 8-bit pattern outputted from the shift register 126 will be a binary one since the input signals appearing on lines 127 and 129 respectively are connected to a +5 voltage source while the second and sixth binary bit of the output pattern will be zero since the input signals appearing on line 131 are tied to ground. The bit pattern 1001 outputted by the shift register 126 during a receiver overrun error condition is shown in FIG. 3A. When the message is received without error, the signals RXERSTAT and RXOVRN will be low resulting in the NAND gate 134 outputting over line 138 a high signal to the shift register 126 which outputs the bit pattern 1010 (FIG. 3C). The shift register 126 is enabled by the receive acknowledge signal RCVACK appearing on line 140 which is the output of a 74LS flip-flop 142 (FIG. 5A) clocked by a receiver done status signal RXDONST appearing on line 144 and which occurs at the completion of the chip receiving the data message.

The signal RXDONST is outputted from a LS74 flip-flop 146 (FIG. 5A) clocked by a signal outputted by the OR gate 122 over line 123. The flip-flop 146 receives over line 148 at its set input a low signal outputted from the NAND gate 150 which in turn receives the high signals $\overline{\text{STATUSRD}}$ over line 118, the system receiver clock RSET over line 151 and the output signal of a flip-flop 152. The flip-flop 152 is clocked by the signal $\overline{\text{DATAVALID}}$ appearing on line 108 to output a high signal to the NAND gate 150. The flip-flop 146 is reset by the receiver reset signal $\overline{\text{RXRESET2}}$ appearing on line 154 of the bus 120 and transmitted from the receiver logic unit 96 (FIG. 4B).

The flip-flop 142 (FIG. 5A) is part of a timing circuit for controlling the operation of the acknowledge control unit 103 (FIG. 4B) and is reset by the acknowledge enable signal ACKEN transmitted from the receiver logic unit 96 (FIG. 4B) over line 145 of the bus 120 at the completion of receiving the transmitted data message. The receive acknowledge signal RCVACK appearing on line 140 enables a LS161 counter 158 (FIG. 5A) which is clocked by the system clock signal TSETR appearing on line 128. The counter 158 will output the appropriate signals upon reaching a count of thirty two over lines 160 and 162 into a logic circuit comprising the NAND gate 164, the inverter 166, the AND gates 168 and 170 and a LS74 flip-flop 172 enabling the AND gate 170 to output the active low acknowledge reset signal $\overline{\text{ACRESET}}$ over line 174 to the transmitter logic unit 66 (FIG. 4B) thereby stopping the transmission of one of the 32-bit acknowledgment messages illustrated in FIGS. 3A–3C inclusive.

Figure 6:
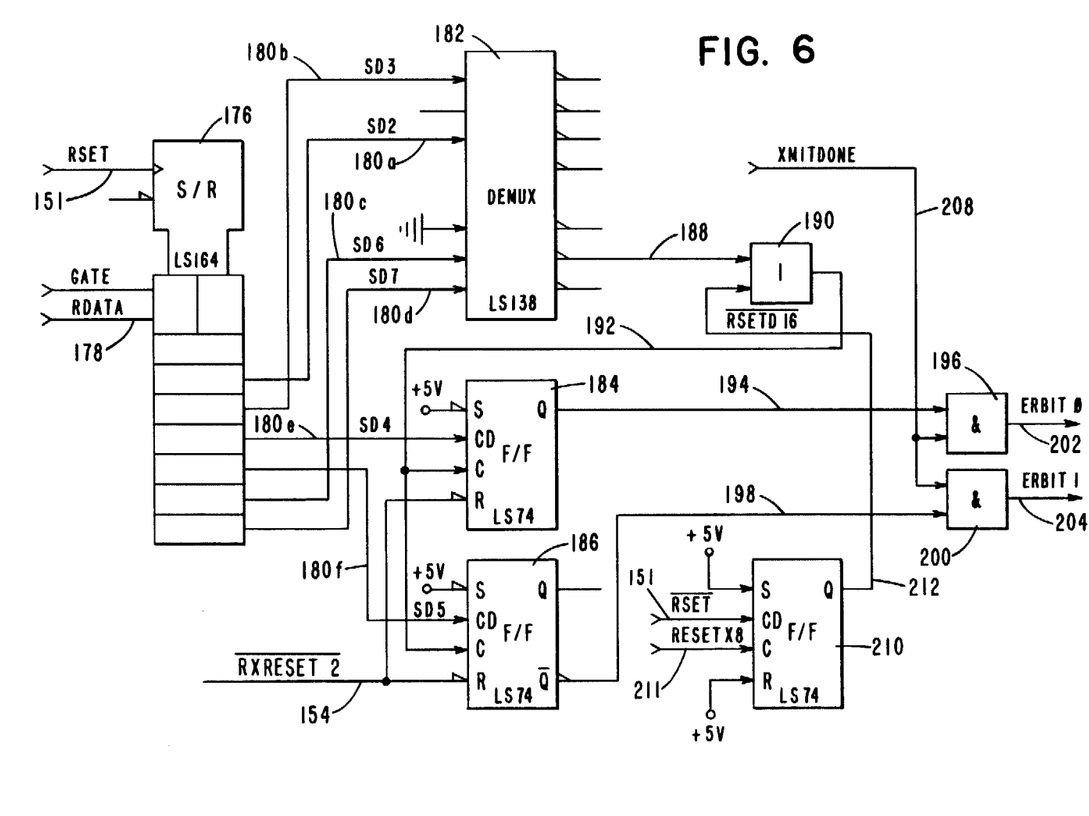
FIG. 6 discloses the logic circuit in the receiver logic unit of FIG. 4B used in processing the received acknowledgment portion of the frame message.

Referring now to FIG. 6, there is shown the logic circuit for processing the acknowledgment message received by the sending device. Included in the circuit, which is located in the receiver logic unit 96 (FIG. 4B), is an LS164 serial-in-parallel-out 8-bit shift register 176 which receives the serial received data signals RDATA over line 178. The shift register 176 will output in parallel the binary bits SD2, SD3, SD6 and SD7 of each 8-bits of the received data over lines 180a–180d inclusive of the bus 181 to a LS138 demultiplexer 182 located in the transmitter logic unit 66 (FIG. 4B), which decodes the input signals to identify the type of acknowledgment message received. Associated with the demultiplexer 182 is a flip-flop 184 whose data input is the fourth data bit SD4 appearing on line 180e and the flip-flop 186 whose data input is the fifth data bit SD5 appearing on line 180f.

Figure 3B:
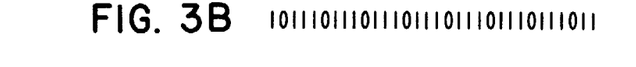
Figure 3C:
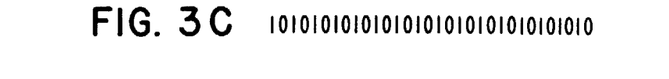

Referring to FIGS. 3A–3C inclusive, it will be seen that the type of acknowledgment message received is identified by the two bits which are framed by the bits 1 and 0 found in the data message. Thus in FIG. 3A, the receiver overrun error bit pattern is identified by binary bits 1 and 0 which are framed by the first binary bits 1 and 0. In a similar manner, the CRC check error bit pattern (FIG. 3B) is represented by the binary bits 1 and 1 while, a good message is represented by the binary bits 1 and 0 (FIG. 3C). The demultiplexer 182, upon sensing the proper framing signals and the binary signals representing the type of acknowledgment message received which appear on lines 180a–180d inclusive, will output a high signal over line 188, the OR gate 190 and line 192 to clock the flip-flops 184 and 186. Depending on the level of the fourth binary bit SD4 of the acknowledgement message appearing on line 180e, the flip-flop 184 will output a signal over line 194 to one input of the AND gate 196. In a similar manner, the flip-flop 186 will output a signal over line 198 to the AND gate 200 in accordance with the signal level of the fifth binary data bit SD5 of the acknowledgement message appearing on line 180f. The AND gates 196 and 200 will output the error signal ERBIT0 and ERBIT1 over lines 202 and 204 to the status register 42 (FIG. 4A). The lines 202 and 204 are part of the bus 206 (FIGS. 4A and 4B). The signal level of the signals ERBIT0 and ERBIT1 correspond to the two binary bits identifying the type of acknowledgment message received as described previously with respect to FIGS. 3A–3C inclusive. Thus, if the acknowledgment message indicates a receiver overrun error condition (FIG. 3A) and identified by the binary bits zero and one, the signal ERBIT0 will be high while the signal ERBIT1 will be low. These signals are stored in the status register 42 which is then read by the processor 21 associated with the chip upon notification by the chip that the data bits are stored in the status register enabling the processor to identify the type of acknowledgement received. The AND gates 196 and 200 are enabled by the high signal XMIT-DONE appearing on line 208 at the completion of the transmission of the message by the transmitter logic unit 66 (FIG. 4B). Further included in the circuit is an LS74 flip-flop 210 which is clocked by an 8-bit delay reset signal RSESETX8 appearing on line 211 which outputs a 16-bit delay reset signal $\overline{RSETD16}$ over line 212 to the OR gate 190 whose output signal will clock the flip-flop 184 and 186 thereby controlling the timing of the generation of the error signals ERBIT0 and ERBIT1.

It will be seen from this construction that the acknowledgment message generated provides a very simple method of notifying the sending transmission unit that the message has been received while indicating the error condition of the message if such has occurred in its transmission utilizing a repeating four bit pattern. It is obvious that by repeating the four bit pattern the sending device can still detect the status of the message sent even if some of the acknowledgment message is lost due to noise or other circumstances.

The integrated circuits disclosed herein are commercially available from the Texas Instruments Corporation of Dallas, Texas.

While the principles of the invention have now been made clear in an illustrated embodiment, it will be obvious to those skilled in the art that many modifications of structure, arrangements, elements and components can be made which are particularly adapted for specific environments and operating requirements without departing from those principles. The appended claims are therefore intended to cover and embrace any such modifications, within the limits only of the true spirit and scope of the invention.

What is claimed is:

1. In a data processing system wherein a plurality of processing devices share a common communication channel by way of which transfer of data messages between a sending processing device and a receiving processing device takes place, an integratd circuit chip associated with each processing device for generating a data message comprising the acknowledgement of the receipt and the received condition of a data message transmitted between the sending processing device and the receiving device, said chip comprising:

means for generating a plurality of first control signals identifying the condition of the data message received from a sending processing device;

first logic circuit means connected to said generating means for outputting a second control signal in response to receiving said first control signals;

a shift register means connected to said generating means and said first logic circuit means for outputting a portion of an acknowledgement message comprising a sequence of two pairs of binary data bits which includes a pair of first binary data bits identifying the condition of the data message receiver from the sensing processing device and a pair of second binary data bits preceding the least significant bit of each of said first binary data bits for use in framing and decoding said first binary data bits in response to receiving said first and second control signals;

transmitting means connected to said communication channel and to said shift register means for repeatedly transmitting said pairs of said first and second binary data bits over said communication channel to the sending processing device a predetermined number of times comprising the acknowledgement message acknowledging the receipt of said data message from the sending device in which each pair of first binary data bits are framed by two pairs of said second binary data bits; and timing means connected to said transmitting means for disabling said transmitting means after said transmitting means has repeatedly transmitted the sequence of pairs of said first and second binary data bits said predetermined number of times over said communication channel.

2. The chip of claim 1 in which said timing means includes:

a binary counting member;

a source of clock signals transmitted to said shift register means and said binary counting member for enabling said shift register means to output pairs of said first and second binary data bits and said counter member to output third control signals representing a predetermined count;

and second logic circuit means connected to said transmitting means and said counting member for outputting a fourth control signal to said transmitting means disabling the operation of said transmitting means in response to receiving said third control signals.

3. The chip of claim 2 in which said pairs of second binary data bits comprise the binary bits one and zero which precede each pair of said first binary data bits.

4. The chip of claim 3 in which said acknowledgment message comprises thirty-two of said first and second binary data bits, said system further including decoding means receiving four binary data bits of the first eight binary data bits of said thirty-two of said first and second binary data bits for outputting clock signals upon detecting the presence of said second binary data bits;

and a plurality of bistable devices receiving two of the remaining first eight binary data bits of said thirty-two of said first and second binary data bits and responsive to the outputting of said clock signals for outputting fifth control signals comprising said first binary data bits identifying the validity of the data message outputted to the receiving processing device.

5. The chip of claim 2 in which said pairs of first binary data bits consist of the binary data bit zero and the binary data bit one representing the receipt of a valid data message.

6. The chip of claim 2 in which said pairs of first binary data bits consist of two binary data bit ones representing the receipt of a data message containing an error.

7. The chip of claim 2 in which said pairs of first binary data bits consist of a binary bit one and a binary bit zero indicating the inability of the receiving processing device to receive the data message.

8. The chip of claim 1 in which said predetermined number of times is eight.

* * * * *

UNITED STATES PATENT AND TRADEMARK OFFICE
CERTIFICATE OF CORRECTION

PATENT NO. : 4,710,871
DATED : December 1, 1987
INVENTOR(S) : William M. Belknap et al.

It is certified that error appears in the above—identified patent and that said Letters Patent is hereby corrected as shown below:

Column 7, line 49, delete "integratd" and substitute --integrated--.

Column 7, line 67, delete "ceiver" and substitute --ceived--.

Column 7, line 67, delete "sensing" and substitute --sending--.

Signed and Sealed this

Nineteenth Day of April, 1988

Attest:

DONALD J. QUIGG

*Attesting Officer*   *Commissioner of Patents and Trademarks*